(12) United States Patent
Carrara et al.

(10) Patent No.: US 8,965,984 B2
(45) Date of Patent: Feb. 24, 2015

(54) ELECTRONIC COMMUNICATION DEVICE AND METHOD FOR PROCESSING MESSAGES

(75) Inventors: Michael Anthony Carrara, Ottawa (CA); Dinah Lea Marie Davis, Waterloo (CA); Kristof Takacs, Waterloo (CA); Ali Mihyar Hesson, Mississauga (CA)

(73) Assignee: BlackBerry Limited, Waterloo (CA)

( * ) Notice: Subject to any disclaimer, the term of this patent is extended or adjusted under 35 U.S.C. 154(b) by 300 days.

(21) Appl. No.: 13/218,965

(22) Filed: Aug. 26, 2011

(65) Prior Publication Data

US 2013/0054704 A1    Feb. 28, 2013

(51) Int. Cl.
*G06F 15/16* (2006.01)
*G06Q 10/10* (2012.01)
*H04L 12/58* (2006.01)

(52) U.S. Cl.
CPC ............... *G06Q 10/107* (2013.01); *H04L 51/14* (2013.01); *H04L 51/34* (2013.01)
USPC ........................................................ 709/206

(58) Field of Classification Search
None
See application file for complete search history.

(56) References Cited

U.S. PATENT DOCUMENTS

| 2005/0135681 | A1 | 6/2005 | Schirmer |
| 2007/0100947 | A1 | 5/2007 | Chen et al. |
| 2007/0214223 | A1 | 9/2007 | Morikubo |
| 2009/0049130 | A1* | 2/2009 | Plooij et al. ................... 709/206 |
| 2009/0113001 | A1* | 4/2009 | Manning et al. ............... 709/206 |
| 2009/0216843 | A1 | 8/2009 | Willner et al. |
| 2010/0036919 | A1* | 2/2010 | Masson et al. ................. 709/206 |
| 2012/0143960 | A1* | 6/2012 | Corrao et al. ................. 709/206 |

FOREIGN PATENT DOCUMENTS

EP    1241610 A2 *  9/2002  ............. G06F 17/60

OTHER PUBLICATIONS

European Patent Application No. 11178984.8 Search Report dated Jan. 26, 2012.
http://www.quickonlinetips.com/archives/2009/03/stop-cancel-undo-sent-gmail-email/.
http://superuser.com/questions/10076/preventing-a-draft-email-from-being-sent.
http://www.echarcha.com/forum/showthread.php?t=23056.

(Continued)

*Primary Examiner* — Mohamed Wasel
*Assistant Examiner* — Tsung Wu
(74) *Attorney, Agent, or Firm* — Perry + Currier Inc.; Kristjan Spence (57) ABSTRACT

According to embodiments described in the specification, an electronic communication device and method for processing messages are provided. The method comprises receiving message data at a processor of the computing device, the message data comprising one or more of an address, a subject and a body; receiving a state indicator at the processor, the state indicator being an indication of a state of the message data; storing the message data and the state indicator in a memory of the computing device, the state indicator being stored in association with the message data; determining, at the processor of the computing device, if the state indicator indicates that the message data is in a draft state; and when the determination is affirmative, preventing transmission of the message data.

17 Claims, 11 Drawing Sheets

(56) References Cited

OTHER PUBLICATIONS http://www.searchenginejournal.com/gmail-mail-googles-prevent-sending-drunk-emails/7803/.

http://gmailblog.blogspot.com/2008/10/new-in-labs-stop-sending-mail-you-later.html.

* cited by examiner

ELECTRONIC COMMUNICATION DEVICE AND METHOD FOR PROCESSING MESSAGES

FIELD

The specification relates generally to electronic communication devices, and more specifically to an electronic communication device for processing messages, such as email messages, and a method for processing messages in the electronic communication device.

BACKGROUND

As the resources of electronic communication devices (including, for example, desktop computers, smart phones and so on) grow, so do the demands imposed on such devices. Those resources, including processing capacity, storage and the like, thus remain valuable and can still be limiting factors in the use of electronic communication devices. Mobile devices, such as smart phones, have relatively small resources in comparison with their larger mains-powered counterparts and can therefore be especially susceptible to increasing demands for new functionality. Network infrastructure is also subjected to increasing demands in terms of speed and capacity. The resources of both the electronic communication devices and the networks through which they communicate are not always put to efficient use.

BRIEF DESCRIPTIONS OF THE DRAWINGS

Embodiments are described with reference to the following figures, in which.

DETAILED DESCRIPTION OF THE EMBODIMENTS

According to an aspect of the specification, a method of processing messages in a computing device is provided, the method comprising: receiving message data at a processor of the computing device, the message data comprising one or more of an address, a subject and a body; receiving a state indicator at the processor, the state indicator being an indication of a state of the message data; storing the message data and the state indicator in a memory of the computing device, the state indicator being stored in association with the message data; determining, at the processor, if the state indicator indicates that the message data is in a draft state; and when the determination is affirmative, preventing transmission of the message data.

According to another aspect of the specification, a non-transitory computer-readable medium is provided for storing computer-readable instructions executable by a processor of a computing device, the instructions for causing the computing device to perform the above method.

According to a further aspect of the specification, a computing device is provided, comprising: a communications interface; a memory; at least one input device; a display; and, a processor interconnected with the communications interface, the memory, the at least one input device and the display, the processor configured to receive message data, the message data comprising one or more of an address, a subject and a body; the processor further configured to receive a state indicator, the state indicator being an indication of a state of the message data; the processor further configured to store the message data and the state indicator in the memory, the state indicator being stored in association with the message data; the processor further configured to determine if the state indicator indicates that the message data is in a draft state; and when the determination is affirmative, to prevent transmission of the message data. The computing device can be a mobile electronic device.

Figure 1:
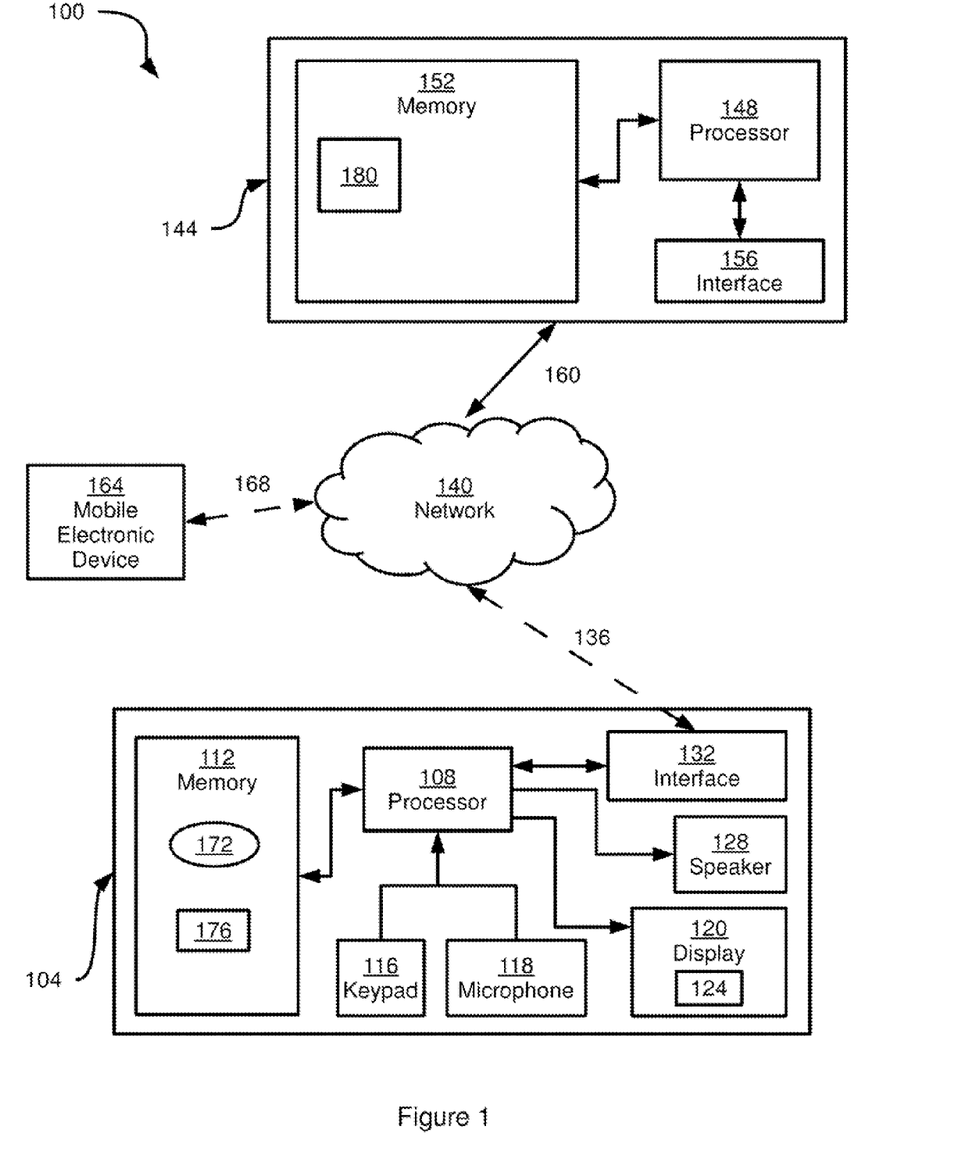
FIG. 1 depicts a system for processing messages, according to a non-limiting embodiment.

FIG. 1 depicts a communications system 100. System 100 includes a computing device in the form of an electronic communication device 104, which in the present example is based on the computing environment and functionality of a hand-held wireless communication device and is therefore also referred to herein as mobile electronic device 104. Mobile electronic device 104 is not limited to a hand-held wireless communication device, however. Other electronic communication devices are also contemplated, such as cellular telephones, smart telephones, Personal Digital Assistants ("PDAs"), media (e.g. MP3) players, laptop computers, tablet computers and the like. In other examples, electronic communication device 104 can be a desktop computer.

Mobile electronic device 104 includes a processor 108 interconnected with a non-transitory computer readable storage medium such as a memory 112. Memory 112 can be any suitable combination of volatile (e.g. Random Access Memory ("RAM")) and non-volatile (e.g. read only memory ("ROM"), Electrically Erasable Programmable Read Only Memory ("EEPROM"), flash memory, magnetic computer storage device, or optical disc) memory. In the present example, memory 112 includes both a volatile memory and a non-volatile memory. Other types of computer readable storage medium are also contemplated, such as compact discs (CD-ROM, CD-RW) and digital video discs (DVD).

Mobile electronic device 104 also includes one or more input devices interconnected with processor 108. Such input devices are configured to receive input and provide data representative of such input to processor 108. Input devices can include, for example, a keypad 116 and a touch screen 118. Thus, keypad 116 can receive input in the form of the depression of one or more keys, and can then provide data representative of such input to processor 108. The data provided to processor 108 can be, for example, an American Standard Code for Information Interchange (ASCII) value for each of the depressed keys. Keypad 116 can be a full QWERTY keypad, a reduced QWERTY keypad or any other suitable arrangement of keys.

In some examples, mobile electronic device 104 can include additional input devices in the form of one or more touch screens, buttons, light sensors and the like (not shown). More generally, any suitable combination of the above-mentioned input devices can be incorporated into mobile electronic device 104.

Mobile electronic device 104 further includes one or more output devices. The output devices of mobile electronic device 104 include a display 120. Display 120 includes display circuitry 124 controllable by processor 108 for generating interfaces which include representations of data and/or applications maintained in memory 112. Display 120 includes a flat panel display comprising any one of, or any suitable combination of, a Liquid Crystal Display (LCD), a plasma display, an Organic Light Emitting Diode (OLED) display, and the like. Circuitry 124 can thus include any suitable combination of display buffers, transistors, LCD cells, plasma cells, phosphors, LEDs and the like. When the input devices of mobile electronic device 104 include a touch screen input device, the touch screen (not shown) can be integrated with display 120.

The output devices of mobile electronic device 104 can also include a speaker 128 interconnected with processor 108. Additional output devices are also contemplated, including, for example, a light-emitting indicator (not shown) in the form of an LED, and a motor or other mechanical output device (not shown) for causing mobile electronic device 104 to vibrate. In general, mobile electronic device 104 can include any suitable combination of the above-mentioned output devices, and may also include other output devices.

Mobile electronic device 104 also includes a communications interface 132 interconnected with processor 108. Communications interface 132 allows mobile electronic device 104 to communicate with other computing devices via a link 136 and a network 140. Network 140 can include any suitable combination of wired and/or wireless networks, including but not limited to a Wide Area Network (WAN) such as the Internet, a Local Area Network (LAN), cell phone networks, WiFi networks, WiMax networks and the like. Link 136 is compatible with network 140. In particular, link 136 can be a wireless link based on any of the Global System for Mobile communications (GSM), General Packet Radio Service (GPRS), Enhanced Data rates for GSM Evolution (EDGE), third and fourth-generation mobile communication system (3G and 4G), Institute of Electrical and Electronic Engineers (IEEE) 802.11 (WiFi) or other wireless protocols or standards. Link 136 can also include any base stations and backhaul links necessary to connect mobile electronic device 104 to network 140.

Communications interface 132 is selected for compatibility with link 136 as well as with network 140. Communications interface 132 thus includes one or more transmitter/receiver assemblies, or radios, and associated circuitry. For example, communications interface 132 can include a first assembly, or radio, for enabling communications over a WiFi network, and a second radio for enabling communications over one or more mobile telephone networks (e.g. 3G networks).

The various components of mobile electronic device 104 are contained within a housing (not shown) comprising any suitable combination of materials (e.g. aluminum, plastics, and the like). The components of mobile electronic device 104 are interconnected via a communication bus (not shown).

Mobile electronic device 104 can be powered by a battery (not shown) also contained within the housing, though it will be understood that mobile electronic device 104 can also be supplied with electricity by a wired connection to a wall outlet or other power source, for example when docked. In other examples, where a computing device such as a desktop computer is provided rather than mobile electronic device 104, certain components need not be contained within the same housing. For example, display 120 can be housed separately from an enclosure housing processor 108 and memory 112. As a further example, keypad can be replaced or supplemented by a keyboard which is housed separately from the enclosure housing processor 108 and memory 112.

System 100 also includes a server 144, which can be based on any known server environment. Server 144 thus includes one or more processors such as a processor 148. Processor 148 is interconnected with a non-transitory computer-readable storage medium, such as a memory 152. Memory 152 can be any suitable combination of volatile (e.g. Random Access Memory ("RAM")) and non-volatile (e.g. read only memory ("ROM"), Electrically Erasable Programmable Read Only Memory ("EEPROM"), flash memory, magnetic computer storage device, or optical disc) memory. Server 144 also includes one or more communications interfaces, such as a communications interface 156, for interconnecting with network 140 via a link 160. In the present embodiment, link 160 is a wired link, and communications interface 156 is a network interface controller (NIC) which enables communications based on the Ethernet standard. It is contemplated, however, that link 160 can be any suitable combination of wired and wireless links, and that the nature of communications interface 156 can be varied according to the nature of link 160.

Server 144 can be controlled by way of input and output devices (not shown) such as a keyboard, a mouse and a display. Such input and output devices can be co-located with server 144 and connected with processor 148 via local connections (e.g. Universal Serial Bus (USB)). In other embodiments, the input and output devices can be located at a terminal (not shown) remote from server 144 and connected to server 144 via network 140 and link 160. In some embodiments, both local input devices and a remote terminal can be present, and server 144 can be controlled via either the local input devices or the remote terminal, as desired.

System 100 can also include additional computing devices, such as a second mobile electronic device 164. It is contemplated that such computing devices can include any number of mobile devices, servers and the like in addition to, or instead of, mobile electronic device 164. Mobile electronic device 164 is connected to network 140 via a link 168, which in the present example is a wireless link, but can also be a wired link or a combination of wireless and wired links.

Mobile electronic device 104 can send and receive communications to and from other computing devices, including mobile electronic device 164. Such communications can include messages such as email messages, Short Message Service (SMS) messages, Multimedia Messaging Service (MMS) messages, and the like. To that end, mobile electronic device 104 stores a messaging application 172 in memory 112. Messaging application 172 comprises a plurality of computer-readable instructions which are executable by processor 108. Processor 108 is configured, via execution of the instructions in messaging application 172, to carry out various functions related to the processing of messages at mobile electronic device 104. Mobile electronic device 104 also stores a message database 176 in memory 112. Message database 176 is used by mobile electronic device 104 to store messages received from other computing devices, messages sent to other computing devices, and messages which have been prepared, or composed, at mobile electronic device 104, but not yet sent. Further discussion of application 172 and message database 176 will be provided below.

Mobile electronic device 104 can enable the preparation of a message for transmission via the execution of application 172 by processor 108, and interaction between processor 108 and the other components of mobile electronic device 104. Mobile electronic device 104 can then transmit an instruction to server 144 to transmit the message to one or more addressees, such as mobile electronic device 164 (or an email account associated with mobile electronic device 164). Server 144 is thus a mail server which maintains and processes an email account associated with mobile electronic device 104. Thus, server 144 stores a message database 180 in memory 152. Message databases 176 and 180 are synchronized in any suitable manner over links 160 and 136, via network 140.

Having received the instruction to send the message, server 144 transmits the message via link 160 and network 140 to the relevant destination, such as mobile electronic device 164 or another mail server (not shown).

Figure 2:
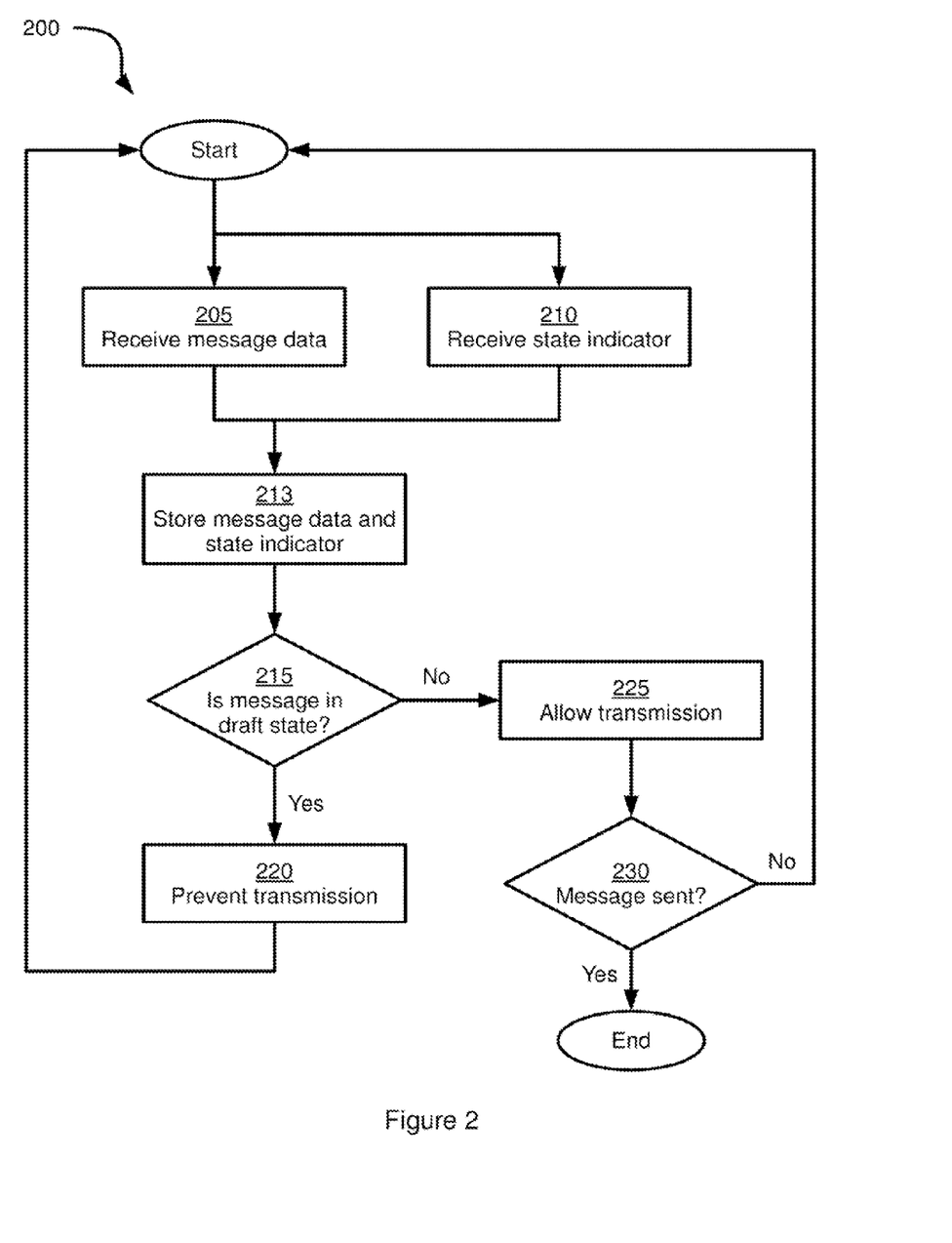
FIG. 2 depicts a method of processing messages, according to a non-limiting embodiment.

Turning now to FIG. 2, a method 200 of processing messages is shown. Method 200 will be described in conjunction with its performance on system 100, and particularly at mobile electronic device 104. It is contemplated, however, that method 200 can be implemented in any suitable system.

The messages to which method 200 pertains are outgoing messages. Outgoing messages as referred to herein are messages to be sent from mobile electronic device 104 to one or more other computing devices. Such outgoing messages are prepared at mobile electronic device 104 prior to being sent. The performance of method 200 is carried out by mobile electronic device 104. Specifically, method 200 is performed by processor 108 (as configured by the execution of messaging application 172) in conjunction with the other components of mobile electronic device 104, which interact with and can be controlled by processor 108.

While the performance of method 200 will be described below in connection with an outgoing email message for illustrative purposes, it is contemplated that method 200 can also be performed in connection with other types of outgoing messages, including SMS and MMS messages.

Beginning at block 205, mobile electronic device 104 is configured to receive message data defining an outgoing email message. At block 210, mobile electronic device 104 is configured to receive a state indicator associated with the message data received at block 205. As will be discussed in further detail below, the message data and the state indicator received at blocks 205 and 210 respectively can be received from an input device of mobile electronic device 104.

The performance of method 200 continues at block 213, at which processor 108 is configured to store the message data received at block 205 in memory 112, and to store the state indicator received at block 210 in memory 112 in association with the message data. In particular, the message data and the state indicator are stored in message database 176.

Figure 3:
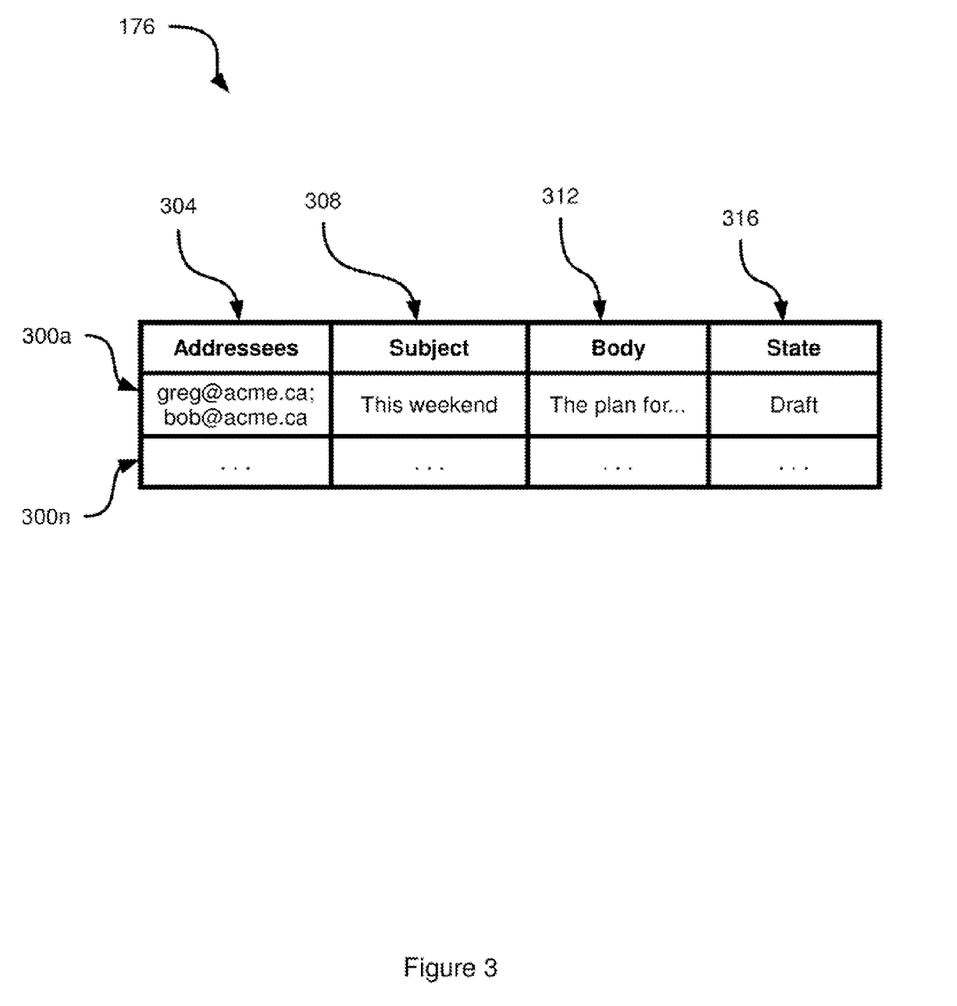
FIG. 3 depicts a message database of the system of FIG. 1, according to a non-limiting embodiment.

Referring to FIG. 3, an example message database 176 is shown. While message database 176 is depicted in a tabular format, it is contemplated that any suitable format can be used, including other tabular formats. Message database 176 can contain a plurality of records 300*a* . . . 300*n* (generically referred to as records 300). Each record 300 contains message data which defines one email message. Database 176 can contain records 300 defining outgoing messages that have not yet been sent, sent messages and received messages. However, for the purpose of describing the performance of method 200, only outgoing messages (that is, unsent messages prepared at mobile electronic device 104) will be discussed.

The example database 176 shown in FIG. 3 contains a record 300*a* defining an outgoing email message. Record 300*a* contains message data in a plurality of data fields as a result of the performance of blocks 205 and 213 of method 200. The fields included in each record 300 include an addressee field 304, a subject field 308 and a body field 312. The addressee field 304 of record 300*a* (referred to as addressee field 304*a*, the suffix 'a' indicating which record the field is contained in; this nomenclature is used elsewhere herein) stores the email addresses of one or more intended recipients of the message. In other words, addressee field 304*a* contains the destination addresses of the outgoing email message. In the present example, addressee field 304*a* contains the email addresses "greg@acme.ca" and "bob@acme.ca", indicating that the outgoing email message defined by record 300*a* is to be delivered to the two above-mentioned addresses. When a field contains data, that data will be referred to herein by the reference numeral of the field, for simplicity. Thus, the contents of subject field 308*a* will also be referred to herein as "subject 308*a*". This nomenclature is also used elsewhere herein.

Subject field 308 can contain an alphanumeric string defining the subject line of the email message. In the present example, subject field 308*a* includes the string "This weekend". Body field 312 can contain data including text, images and the like and defines the "content" portion of the message. In the present example, body field 312*a* includes the string "The plan for" as well as other text (not shown). The contents of fields 304, 308 and 312 is not particularly limited: a wide variety of email addresses and content are possible.

Each record 300 of database 176 also includes a state indicator field 316 distinct from the addressee field 304, the subject field 308 and the body field 312 (that is, distinct from the message data). State indicator field 316 can contain a state indicator, which is an indication of the state, or type, of the message. In particular, the state indicator 316 of any given record 300 indicates whether or not the message defined by the data in that record 300 is in a "draft" state. In general, a draft state is a state in which the message is not yet ready for transmission.

The reasons for which a message may be considered to be in a draft state are not particularly limited. For example, the message may be incomplete and require additional message data prior to transmission. Additional data which may be required prior to transmission may be formatting data, additional content for the body of the message, and the like. A message may also be incomplete if data is to be removed prior to transmission. For example, notes to the author of the message (such as reminders to insert certain content into the message), inappropriate or emotionally charged language, sensitive information and the like may need to be removed prior to transmission of the message. Any combination of the above, as well as a variety of other factors, may lead to a message being indicated as being in a draft state.

In the present example, as a result of the performance of blocks 210 and 213 of method 200, record 300*a* includes a state indicator 316*a*, which indicates that the message defined by record 300*a* is in a "draft" state, meaning it is not yet ready for transmission.

Referring to FIG. 2, it is contemplated that blocks 205, 210 and 213 of method 200 can be performed in a variety of ways and sequences. For example, message data can be received before a state indicator, or vice versa. Further, message data can be stored immediately upon receipt, even if a state indicator has not yet been received. Likewise, a state indicator can be stored immediately upon receipt, even if no message data has been received yet. A variety of ways of receiving and storing message data and state indicators are contemplated, as will be described in further detail below. In general, the message data and state indicator 316 for a given outgoing message are stored in association with each other in memory 112 by virtue of being contained within the same record 300 in database 176.

The performance of method 200 continues at block 215, at which processor 108 of mobile electronic device 104 is configured to determine, for a given outgoing email message, whether that message is in a draft state according to the state indicator 316 of the message. Processor 108 is configured to make the determination at block 215 by examining the state indicator 316 in message database 176 for the record 300 which defines the outgoing message in question. When the determination is affirmative (that is, the state indicator 316 indicates that the message is in a draft state), the performance of method 200 proceeds to block 220. Thus, continuing with the present example performance of method 200, processor 108 would determine that record 300a defines a message which is in a draft state, since state indicator 316a is "draft". Thus, the performance of method 200 advances to block 220.

At block 220, following an affirmative determination at block 215, mobile electronic device 104 is configured to prevent transmission of the outgoing message determined to be in a draft state. The transmission to be prevented is the transmission of the message to the addresses in address field 304. Transmission of the message to mail server 144 solely for backup purposes is not necessarily prevented at block 220.

In the present example performance of method 200, as a result of the performance of block 220, transmission of the outgoing email message defined by record 300a is prevented. The performance of block 220 can also include the prevention of delayed transmission of the message. That is, mobile electronic device 104 can prevent scheduling the message for transmission at a later time, as well as immediate transmission of the message. It is contemplated that "prevention" as used herein need not refer to indefinite prevention of transmission. Instead, prevention can refer to a transient prevention or blocking which can be bypassed. For example, mobile electronic device 104 can perform block 220 of method 200 by presenting a warning prior to transmission of the message. Thus, transmission of the draft outgoing message may not necessarily be absolutely prevented, but instead may be prevented until further instructions are received. For example, transmission can be prevented until confirmation is received at mobile electronic device 104 that the message is to be transmitted despite the presence of a draft state indicator 316.

Following the performance of block 220, the performance of method 200 can include repeated performances of either or both of blocks 205 and 210, followed by repeated performances of blocks 213 and 215. For example, if an outgoing message is in the process of being prepared, additional message data may be received for the message, and the state indicator for the message may be changed. In other words, a new state indicator may be received to replace the previous state indicator received in the initial performance of block 210.

Figure 4:
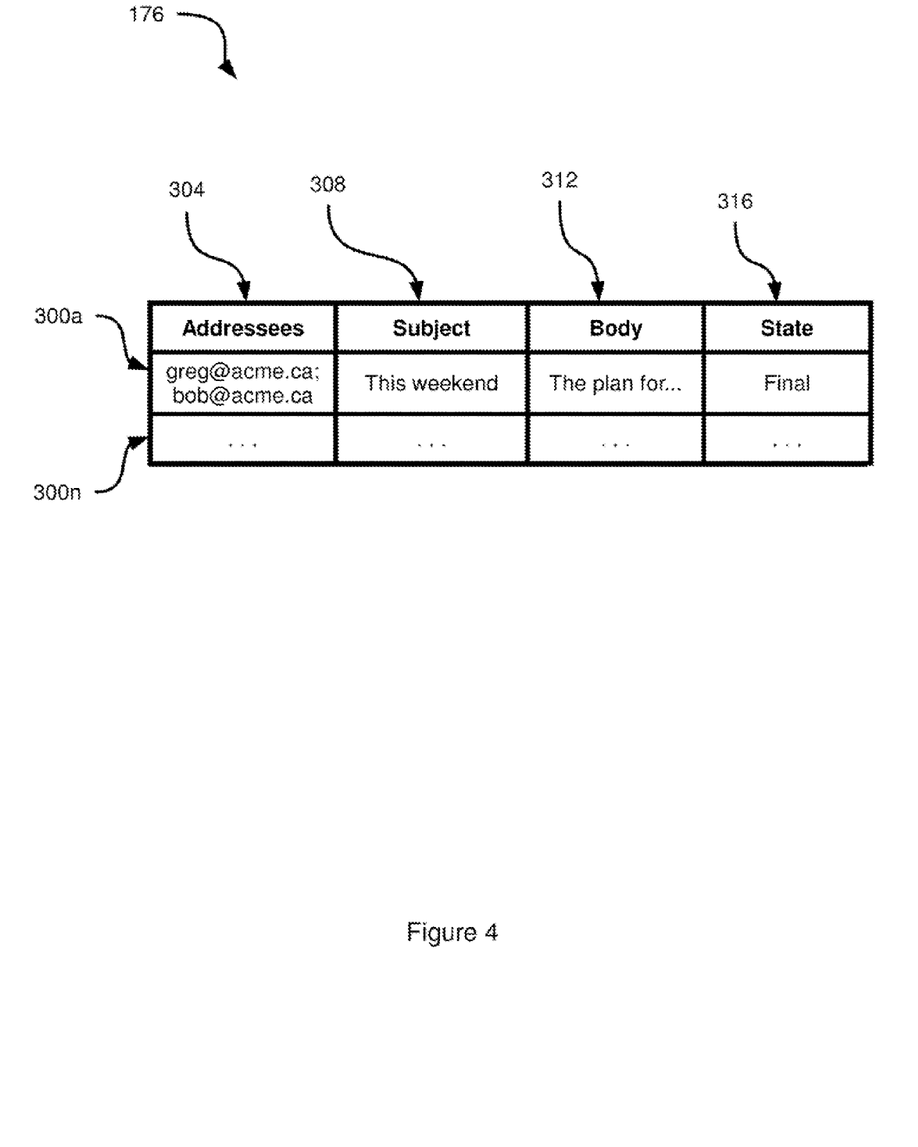
FIG. 4 depicts a modification to the message database of FIG. 3, according to a non-limiting embodiment.

Continuing with the present example performance of method 200, it will be assumed that after the initial performance of block 220, another state indicator (that is, an updated state indicator) is received in a second performance of block 210. The updated state indicator is stored in memory 112 at block 213. Turning to FIG. 4, a modified version of database 176 resulting from the second performance of blocks 210 and 213 is shown, in which state indicator 316a is now "Final" rather than "Draft". Thus, state indicator 316a indicates that the message defined by record 300a is no longer in a draft state, and is ready for transmission. It is contemplated that in other examples, the updated state indicator 316a which replaces the original state indicator 316a shown in FIG. 3 can be a lack of data in state indicator field 316a (that is, updated state indicator 316a can be null or empty). In still other examples, the terms "Draft" and "Final" can be replaced by numerical values, such as "1" for a draft state, and "0" for a non-draft, or final, state. In general, any updates to state indicator 316a are received at processor 108 from an input device of mobile electronic device 104.

Continuing with the example performance of method 200, following the repeated performance of blocks 210 and 213, processor 108 is configured to repeat the performance of block 215. This time, the determination at block 215 would be negative, as state indicator 316a no longer indicates that the message defined by record 300a is in a draft state. Thus, the performance of method 200 would proceed to block 225 rather than block 220.

When the determination at block 215 is negative (that is, when state indicator 316 for the record in question does not indicate that the message is in a draft state) the transmission of the message is allowed at block 225. In other words, at block 225 mobile electronic device 104 is configured to accept and act on an instruction, when such an instruction is received, to transmit the message, as described earlier in conjunction with FIG. 1.

It is noted that allowing transmission of the message at block 225 does not necessarily mean that the message will be transmitted. The message may remain unsent until an instruction to send the message is received, for example from an input device of mobile electronic device 104. At block 230, if the message has not yet been sent (meaning the message is still stored in database 176 as an outgoing message), the performance of method 200 may be repeated. As mentioned above, this can include updating either or both of the message data and state indicator for the message, which may result in transmission being prevented. For example, state indicator 316a of record 300a could be reverted to "draft" in yet another performance of blocks 210 and 213, in which case transmission of the message defined by record 300a would once again be prevented. Once the message has been sent, method 200 ends.

It is contemplated that receiving message data and a state indicator at blocks 205 and 210, respectively, for storage at block 213 can be effected in a variety of ways.

Figure 5:
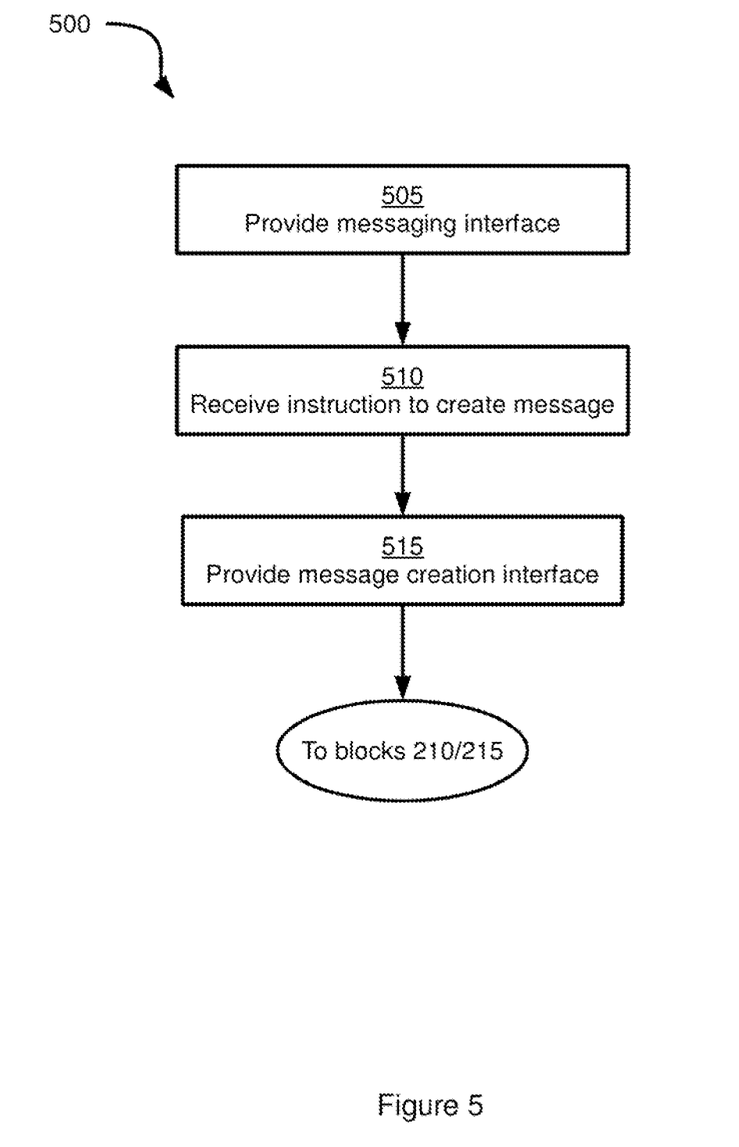
FIG. 5 depicts a method of receiving data in the system of FIG. 1, according to a non-limiting embodiment.

Turning to FIG. 5, a method 500 is shown for enabling the receipt of message data and state indicators in method 200. Method 500 is performed by mobile electronic device 104, via execution of the instructions of application 172, and method 500 can thus be combined with method 200. In particular, method 500 can be performed before the performance of blocks 205 and 210 of method 200.

The performance of method 500 begins at block 505, at which processor 108 is configured to control display 120 to generate a messaging interface by executing messaging application 172. An example messaging interface 600 is shown generated on display 120 in FIG. 6. Interface 600 can include various representations of data. For example, interface 600 includes a status information region 604, which includes representations of any one or combination of the battery level of mobile electronic device 104, a signal strength detected by communications interface 132, the time and date, and the like.

Figure 6:
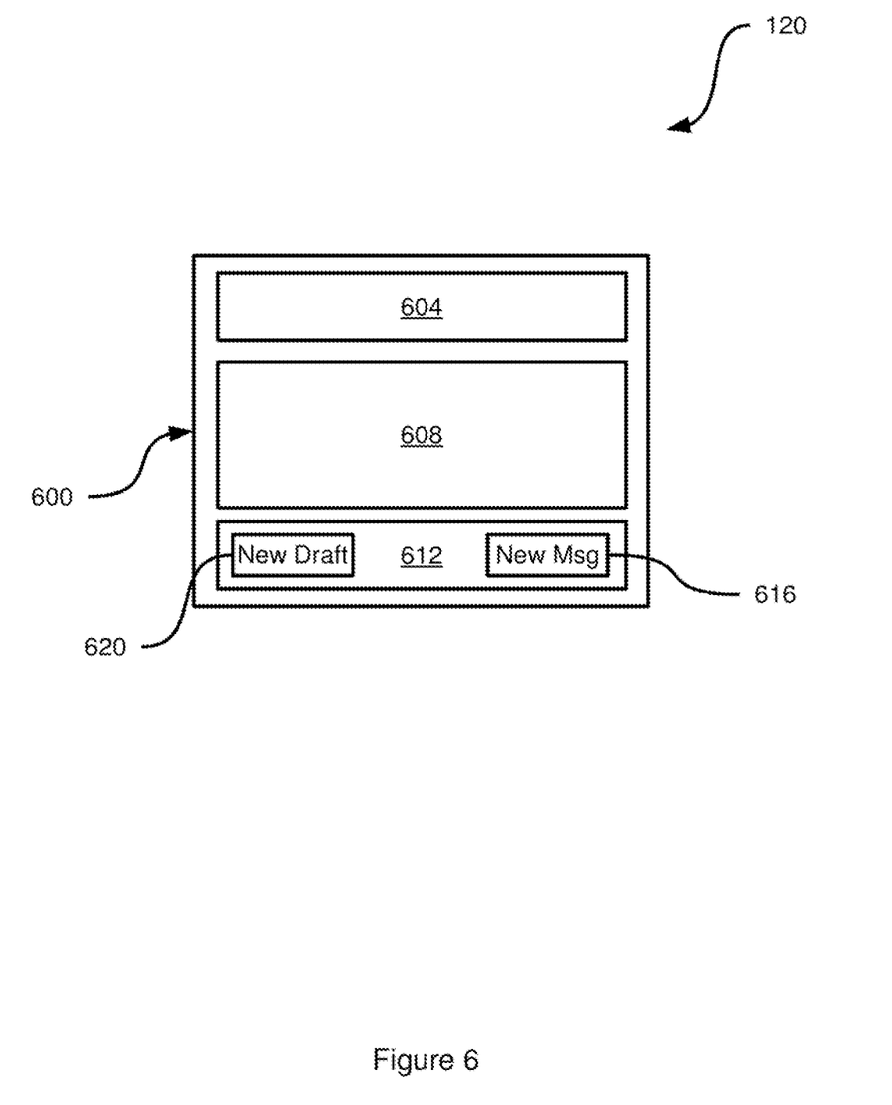
FIG. 6 depicts an interface provided during an example performance of the method of FIG. 5, according to a non-limiting embodiment.

Interface 600 further includes a messages region 608, which can include, for example, representations of the messages received at and sent from mobile electronic device in a list format. Interface 600 further includes a controls region 612 which includes selectable interface elements for controlling mobile electronic device 104 during the execution of application 172. Selectable interface elements can include a "new message" element 616, which is selectable by an input device of mobile electronic device 104. Other selectable interface elements can include a "new draft" element 620, which is also selectable by an input device of mobile electronic device 104. Selectable elements 616 and 620 will be discussed in greater detail below.

Referring back to FIG. 5, the performance of method 500 continues at block 510, at which processor 108 is configured to receive an instruction to create a new outgoing message. As noted in connection with method 200, the instruction can relate to any type of message, including email, SMS and MMS messages. Referring again to FIG. 6, the instruction to create a new message can comprise selection of either of elements 616 and 620 of interface 600. Such selection can be carried out be focussing on the desired element and depressing a key on keypad 116, for example. In other examples, the instruction can include the selection of a menu item (not shown) rather than elements 616 or 620. For example, depressing a particular key on keypad 116 can cause processor 108 to update interface 600 to include a menu which includes one or both of a "new message" option and a "new draft" option.

Figure 7:
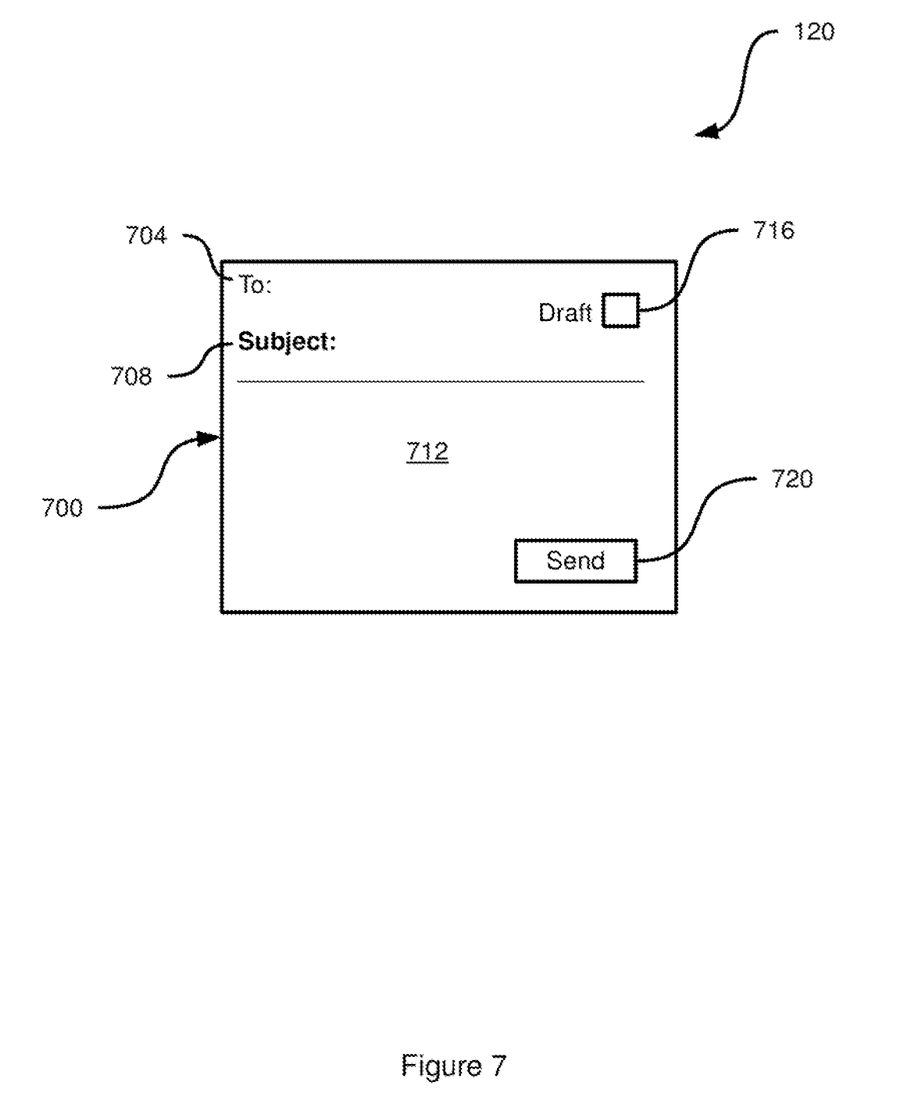
FIG. 7 depicts an additional interface provided during an example performance of the method of FIG. 5, according to a non-limiting embodiment.

Having received an instruction to create a new message, processor 108 is then configured, at block 515, to provide a message creation interface on display 120. Turning to FIG. 7, an example message creation interface 700 is shown. Message creation interface 700 includes a variety of selectable interface elements and fields for receiving input data. In particular, interface 700 includes a "To" field 704, into which one or more destination addresses for the new outgoing message can be inserted. Message creation interface 700 also includes a "Subject" field 708 into which a subject line can be inserted, and a message body field 712 into which the body, or content, of the outgoing message can be inserted. It is contemplated that input inserted into the above fields (for example, from keypad 116 or other input devices) will be stored in a record 300 of database 176. Specifically, the contents of field 704 will be stored in addressee field 304, the contents of field 708 will be stored in subject field 308, and the contents of field 712 will be stored in body field 312.

Interface 700 also includes a checkbox 716 for indicating whether the message data associated with interface 500 is in a draft state. Checkbox 716 is selectable via one or more input devices of mobile electronic device 104. Selecting checkbox 716 toggles the state of checkbox between an unchecked state, shown in FIG. 7, and a checked state. In the unchecked state, checkbox 716 indicates that the message is not in a draft state, and causes processor 108 to store a non-draft state indicator in field 316 of database 176. In the checked state, checkbox 716 indicates that the message is in a draft state, and causes processor 108 to store a draft state indicator 316 in database 176. Thus, the receipt of input checking and unchecking checkbox 716 corresponds to the receipt of a state indicator at block 210 of method 200, as discussed above.

Interface 700 also includes a selectable "send" element 720, selection of which by way of an input device is for causing processor 108 to initiate the transmission of the outgoing message. Send element 720 can also be replaced or supplemented with a menu option (not shown) which is selectable for causing processor 108 to transmit the message.

Returning to FIG. 5, the provision of interface 700, or any suitable variation thereof, thus enables mobile electronic device 104 to receive message data and a state indicator as discussed in connection with blocks 205 and 210 of method 200.

It is contemplated that the performance of method 500 itself can also include the receipt of a state indicator along with the instruction to create a new message. The generation of message creation interface 700 can be accompanied by the creation of a new record 300 in database 176. Thus, a state indicator can be "received" automatically by processor 108 when the new record 300—which includes state indicator field 316—is created. For example, state indicator field 316 may begin with no data therein, which is an indication that the message is not in a draft state. State indicator field 316 can also begin with a "final" state indicator (or any other suitable value indicating a non-draft state) therein. Processor 108 can be configured to create the new record 300 with a non-draft state indicator (including an empty state indicator field 316) in response to selection of element 616 of interface 600. It is contemplated that selection of a "new message" menu option can also cause processor 108 to carry out the above functions.

In another example, processor 108 can be configured to insert a draft state indicator in the new record 300. For instance; when element 620 of interface 600 (or a similar menu option, or any other suitable selectable interface element) is selected, processor 108 can be configured to provide interface 700 with checkbox 716 ticked, and to create a new record 300 with a draft state indicator 316.

The layout and contents of interfaces 600 and 700 is provided for illustrative purposes, and variations thereto are contemplated. For example, some or all of the selectable interface elements can be omitted and replaced, by menu options. That is, in some examples, checkbox 716 can be omitted, and state indicators can be received by selection of menu options (not shown) via an input device such as keypad 116. In other examples, selection of menu options or other interface elements (such as the elements shown in FIGS. 5 and 6) is not necessary for implementing the above functionality. Instead, such functionality can be initiated in response to the depression of certain key combinations on keypad 116, or in response to certain audible signals (e.g. spoken words, tones and the like) detected at microphone 118.

It is further contemplated that preventing the transmission of an outgoing message at block 220 can be effected in a variety of ways.

Figure 8:
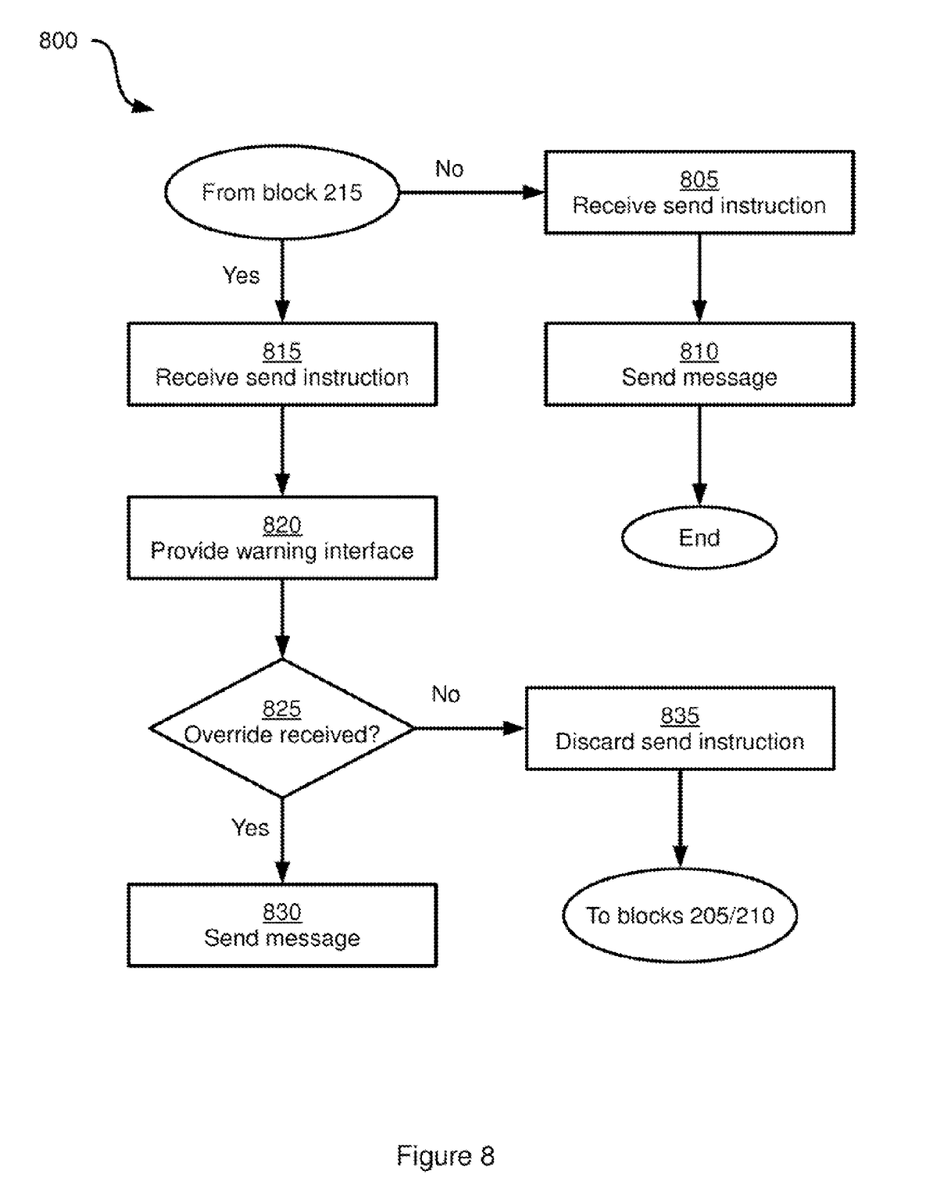
FIG. 8 depicts a method of preventing or allowing transmission of a message in the system of FIG. 1, according to a non-limiting embodiment.

Turning to FIG. 8, a method 800 of preventing or allowing transmission of an outgoing message is shown. Method 800 is performed by mobile electronic device 104, via execution of the instructions of application 172 by processor 108. Method 800 can thus be combined with method 200, with the blocks of method 800 being performed after the determination at block 215. An example performance of method 800 will now be described in connection with record 300a as discussed above. As seen in FIG. 4, state indicator 316a of record 300a indicates that the message defined by record 300a is not in a draft state. Thus, the determination at block 215 would be negative.

Following a negative determination at block 215, processor 108 is configured at block 805 to receive an instruction to send the message defined by record 300a. The nature of a "send" instruction is not particularly limited. For example, the send instruction can be received at processor 108 as a result of a selection of the "send" element 720 shown in FIG. 7 by an input device of mobile electronic device 104.

The performance of method 800 proceeds at block 810, at which processor 108 is configured to send the message defined by record 300a. Sending the message comprises controlling communications interface 132 to transmit the message to server 144 for delivery to the addresses contained in addressee field 304. After the performance of block 810 is complete, method 800 ends. Thus, the performance of blocks 805 and 810 encompasses the performance of blocks 225 and 230 of method 200.

If, on the other hand, the determination at block 215 was affirmative (for example, assuming state indicator 316a was updated once again to "draft"), the performance of method 800 would proceed to block 815 instead of block 805. At block 815, an instruction to send the message defined by record 300a is received by processor 108, as described above in connection with block 805.

Figure 9:
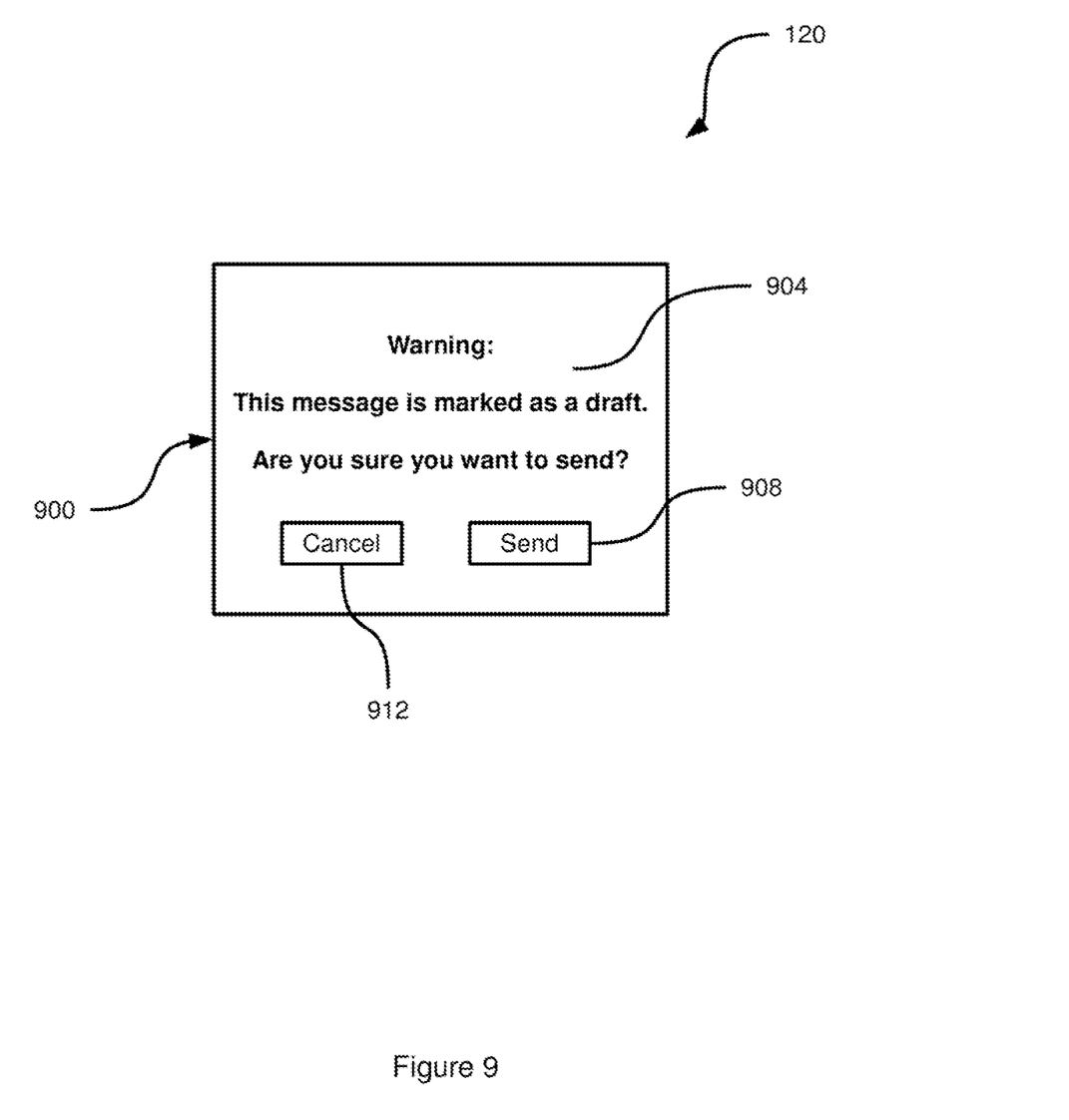
FIG. 9 depicts an interface provided during an example performance of the method of FIG. 8, according to a non-limiting embodiment.

Proceeding to block 820, processor 108 is configured to control display 120 to provide a warning interface in response to receiving the send instruction, rather than to send the message. An example warning interface 900 is shown in FIG. 9, as generated on display 120 under the control of processor 108. Interface 900 includes an indication that the message in connection with which the send instruction was received is in a draft state. Interface 900 also includes two selectable elements 908 and 912. Element 908 is a "send" element, which is selectable by an input device (for example, by bringing element 908 into focus on display 120 and depressing a particular key on keypad 116). Element 912 is a "cancel" element, which is also selectable by an input device.

Returning to FIG. 8, at block 825, processor 108 is configured to determine whether an override instruction has been received. An override instruction is an instruction for causing processor 108 to initiate the transmission of the message despite the presence of draft state indicator 316a. Turning again to FIG. 9, the override instruction can be a selection of send element 908 at processor 108. Assuming, in the present example performance of method 800, that the determination at block 825 is affirmative (i.e. that an override instruction has been received), method 800 proceeds to block 830, at which the message defined by record 300a is sent.

If, on the other hand, an override instruction was not received, the determination at block 825 would be negative. A negative determination can result, for example, from a selection of the cancel element 912 of interface 900. In some examples, a negative determination can also result when no input data selecting either of elements 908 or 912 is received for a predetermined amount of time after the generation of interface 900. Following a negative determination, processor 108 can discard the send instruction at block 835 and control display 120 to revert to message creation interface 700 and return to blocks 205 and 210 of method 200, as discussed above. Thus, the performance of blocks 815-835 encompass the performance of block 220 of method 200.

Figure 10:
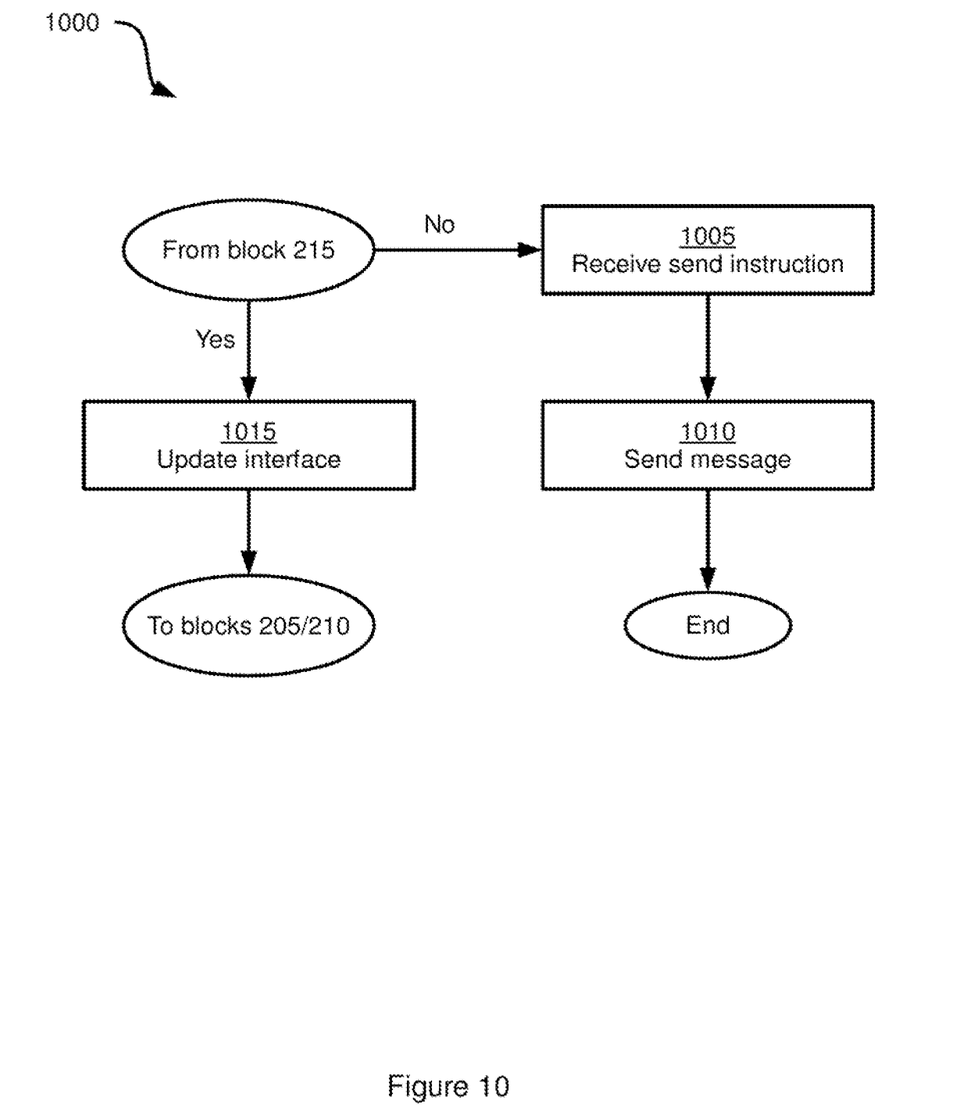
FIG. 10 depicts a method of preventing or allowing transmission of a message in the system of FIG. 1, according to another non-limiting embodiment.

Turning now to FIG. 10, another example method 1000 of preventing or allowing transmission of an outgoing message is shown. Method 1000 is performed by mobile electronic device 104, via execution of the instructions of application 172 by processor 108. Method 1000 can thus be combined with method 200, with the blocks of method 1000 being performed after the determination at block 215.

When the determination at block 215 is negative, the performance of method 1000 proceeds to blocks 1005 and 1010, where the message is sent as described above in connection with blocks 805 and 810 of method 800.

Figure 11:
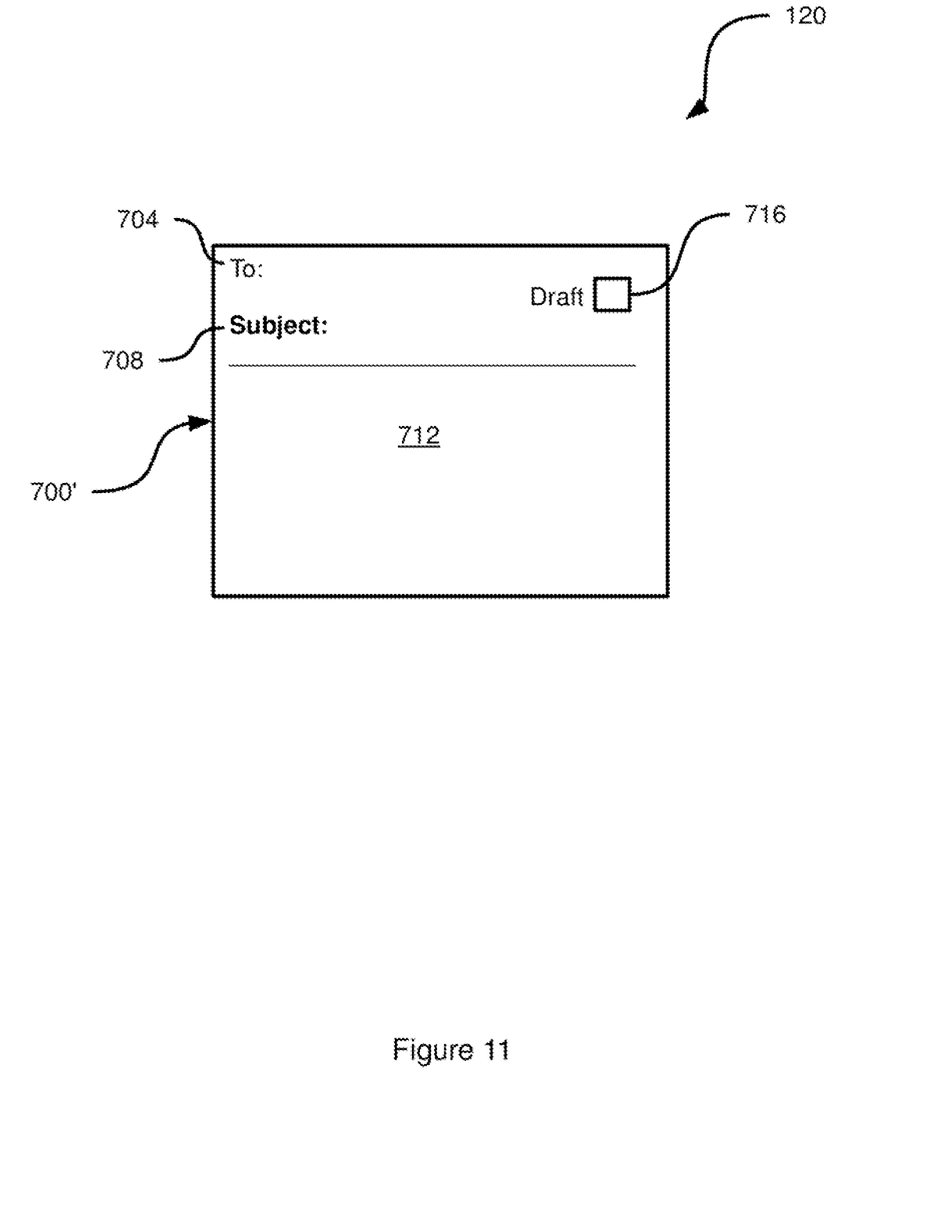
FIG. 11 depicts an interface provided during an example performance of the method of FIG. 10, according to a non-limiting embodiment.

When the determination at block 215 is affirmative, the performance of method 1000 instead proceeds to block 1015. At block 1015, processor 108 is configured to control display 120 to update message creation interface 700. In general, message creation interface 700 (or any suitable variation thereof) is updated to prevent the transmission of the message. Turning to FIG. 11, an updated interface 700' is shown. Interface 700' is largely as described in connection with FIG. 7, with the exception that the "send" element 720 is no longer present. Thus, it is no longer possible for a send instruction to be generated via interface 700'. It is contemplated that various other updates to interface 700 can be undertaken by processor 108 in addition to, or instead of, removing send element 720. For example, rather than removing send element 720, send element 720 can be "ghosted" or "greyed out" and made non-selectable. As another example, any menu items (not shown) which can be invoked in connection with interface 700 can be, modified to no longer include menu options whose selection results in a send instruction being sent to processor 108. In a further example, such menu options can be greyed out rather than removed.

Following the provision of updated message creation interface 700', the performance of method 1000 concludes, and returns to blocks 205 and 210 of method 200.

Those skilled in the art will appreciate that in some embodiments, the functionality of processor 108 as configured by the execution of application 172 may be implemented using pre-programmed hardware or firmware elements (e.g., application specific integrated circuits (ASICs), electrically erasable programmable read-only memories (EEPROMs), etc.), or other related components.

Persons skilled in the art will appreciate that there are yet more alternative implementations and modifications possible for implementing the embodiments described herein, and that the above implementations and examples are only illustrations of one or more embodiments. The scope, therefore, is only to be limited by the claims appended hereto.

We claim:

1. A method of processing messages in a computing device having a processor interconnected with a memory, a display and an input device, the method comprising:
    providing, on the display, a messaging interface including two options, each selectable for creating a new message;
    upon receiving, at the processor from the input device, a selection of either one of the two options, providing a message creation interface on the display, comprising an element selectable for generating an instruction to transmit a message;
    receiving message data at the processor, the message data comprising one or more of an address, a subject and a body;
    setting a state indicator upon provision of the message creation interface on the display, based on which one of the two options was selected via the input device, and updating the state indicator if an update is received at the processor from the input device, the state indicator being an indication of a state of the message data;
    storing the message data and the state indicator in the memory, the state indicator being stored in association with the message data;
    determining, by the processor, if the state indicator indicates that the message data is in a draft state; and
    when the determination is affirmative, preventing transmission of the message data by updating the message creation interface to render the element non-selectable.

2. The method of claim 1, further comprising:
    when the determination is negative, allowing transmission of the message data.

3. The method of claim 1, wherein the message data is received from the input device.

4. The method of claim 1, further comprising:
    receiving an updated state indicator from the input device;
    storing the updated state indicator in the memory in association with the message data; and,
    repeating the determination.

5. The method of claim 4, wherein storing the updated stated indicator comprises replacing the state indicator with the updated state indicator in the memory.

6. The method of claim 1, wherein the message data is received at the message creation interface.

7. A computing device, comprising:
a communications interface;
a memory;
at least one input device;
a display; and,
a processor interconnected with the communications interface, the memory, the at least one input device and the display, the processor configured to provide a messaging interface on the display, including two options, each selectable for creating a new message;
the processor further configured, upon receiving a selection of either one of the two options from the at least one input device, to provide a message creation interface on the display, comprising an element selectable for generating an instruction to transmit a message; and to receive message data, the message data comprising one or more of an address, a subject and a body;
the processor further configured to set a state indicator based on which one of the two options was selected via the input device, and to update the state indicator if an update is received from the input device, the state indicator being an indication of a state of the message data;
the processor further configured to store the message data and the state indicator in the memory, the state indicator being stored in association with the message data;
the processor further configured to determine if the state indicator indicates that the message data is in a draft state; and when the determination is affirmative, to prevent transmission of the message data by updating the message creation interface to render the element non-selectable.

8. The computing device of claim 7, the processor being further configured, when the determination is negative, to allow transmission of the message data.

9. The computing device of claim 7, wherein the message data is received at the processor from the input device.

10. The computing device of claim 7, the processor being further configured to receive an updated state indicator from the input device; store the updated state indicator in the memory in association with the message data; and repeat the determination.

11. The computing device of claim 10, wherein storing the updated stated indicator comprises replacing the state indicator with the updated state indicator in the memory.

12. The computing device of claim 7, the processor configured to receive the message data at the message creation interface.

13. A non-transitory computer-readable storage medium for storing computer-readable instructions executable by a processor of a computing device having a memory, a display and an input device interconnected with the processor, the instructions for causing the computing device to perform a method comprising:
providing a messaging interface on the display, including two options each selectable for creating a new message;
upon receiving, at the processor from the input device, a selection of either one of the two options, providing a message creation interface on the display, comprising an element selectable for generating an instruction to transmit a message;
receiving message data at the processor, the message data comprising one or more of an address, a subject and a body;
setting a state indicator upon provision of the message creation interface on the display, based on which one of the two options was selected via the input device, and updating the state indicator if an update is received at the processor from the input device, the state indicator being an indication of a state of the message data;
storing the message data and the state indicator in the memory, the state indicator being stored in association with the message data;
determining, at the processor of the computing device, if the state indicator indicates that the message data is in a draft state; and
when the determination is affirmative, preventing transmission of the message data by updating the message creation interface to render the element non-selectable.

14. The non-transitory computer-readable storage medium of claim 13, the method further comprising:
when the determination is negative, allowing transmission of the message data.

15. The non-transitory computer-readable storage medium of claim 13, the method further comprising:
receiving an updated state indicator from the input device;
storing the updated state indicator in the memory in association with the message data; and,
repeating the determination.

16. The non-transitory computer-readable storage medium of claim 15, wherein storing the updated stated indicator comprises replacing the state indicator with the updated state indicator in the memory.

17. The non-transitory computer-readable storage medium of claim 13, wherein the message data is received at the message creation interface.

* * * * *